Oct. 5, 1954 J. SALTZ ET AL 2,691,156

MAGNETIC MEMORY READING SYSTEM

Filed May 29, 1953 2 Sheets-Sheet 1

INVENTORS
Julian Saltz &
Charles S. Warren

BY Morris L. Rabkin

ATTORNEY

Oct. 5, 1954 J. SALTZ ET AL 2,691,156

MAGNETIC MEMORY READING SYSTEM

Filed May 29, 1953 2 Sheets-Sheet 2

INVENTORS
Julian Saltz &
Charles S. Warren
BY Morris B. Pabkin
ATTORNEY

Patented Oct. 5, 1954

2,691,156

UNITED STATES PATENT OFFICE 2,691,156

MAGNETIC MEMORY READING SYSTEM

Julian Saltz, Philadelphia, Pa., and Charles S. Warren, Collingswood, N. J., assignors to Radio Corporation of America, a corporation of Delaware Application May 29, 1953, Serial No. 358,502

10 Claims. (Cl. 340—174)

This invention relates to static magnetic matrix memories and more particularly is an improvement in the method and apparatus for reading the condition of such memory.

In an article by Jay W. Forrester, Journal of Applied Physics, January 1951, page 44, entitled "Digital information storage in three dimensions using magnetic cores," and an article by Jan A. Rajchman in the RCA Review, for June 1952, entitled "Static magnetic matrix memory and switching circuits," there have been described magnetic matrix memories which consist of a plurality of magnetic cores having a substantially rectangular hysteresis characteristic. These cores are arranged in columns and rows for convenience. A number of coils designated as row coils are provided, a separate one of which is coupled to all the cores in a different one of the rows. A number of column coils are also provided; a separate one of these is coupled to each of the columns of magnetic cores. Information is stored in the cores in binary fashion. That is to say that a core is driven to saturation at one polarity, say P, to represent one binary digit, and is driven to saturation at the opposite polarity or N to represent a second binary digit. Current is applied to a row coil and a column coil which are coupled to a core whose saturation polarity it is desired to change. The amplitude of the currents applied to the selected row coil and column coil is on the order of at least half of that required to drive the selected core. Accordingly, the selected core receives a total of one driving unit; cores which are coupled either to the row coil alone or to the column coil alone receive only half the required critical excitation and therefore do not change their remnant condition.

For the purpose of reading the information stored in any particular core, a reading coil has been provided. This consists of a coil which is coupled to every core in the memory array. Usually, the coils coupled to the core whose condition it is desired to be read are excited to drive this core to the condition P. If the core is already at P, substantially no change occurs in its magnetic condition and no voltage is induced in the reading coil coupled thereto. If the reading coil is in condition N, a large voltage is induced in the reading coil. Accordingly, by driving any one of the cores in a matrix in a P going direction and by observing the output in the reading coil, one can determine what the condition of the core is. While the theory is relatively simple for reading the condition of cores, in practice a great many difficulties have presented themselves. It is known that the slopes of the hysteresis curve of magnetic material in the saturation regions are not exactly flat. Accordingly, half driven cores can and do have some magnetic excursion. This induces voltage in the reading coil which can either mask the voltage induced from the desired core or present a voltage at the output of the reading coil, thus giving the erroneous impression that the selected core was at condition N when it actually was at P. One expedient used to avoid such a result was to put the reading coil on the cores so that the sense of the winding was opposite adjacent cores. This therefore would cause any voltages induced as a result of magnetic excursions of half driven cores to oppose each other in the coil, thus cancelling out, leaving the voltage from the desired core.

This considerably reduces the amount of undesired voltage obtained from a matrix, but it does not completely cause cancellation. The reason is that, for each core, the slopes of the hysteresis curve in the positive and negative saturation regions are not the same. Furthermore, the response of the magnetic cores to a driving force may not be identical, some cores responding slower than others. Thus, the cancellation voltages or voltages from the half driven cores may not be of the same amplitude, nor may their maximums occur at the same time. It would therefore seem that in order to provide matrices having large numbers of cores, other expedients must be resorted to, to eliminate unwanted signal.

One such is the system for integrating the output of the reading coil over a complete cycle of P and N drives. This is described in an application by R. Stuart-Williams, Serial No. 344,735, filed March 26, 1953, for "Memory System" and assigned to this assignee. Another system for increasing the desired to undesired signal ratio in the reading coil of a magnetic matrix is found in an application of Jan A. Rajchman and Milton Rosenberg, Serial No. 353,817, filed May 8, 1953, for "Magnetic Memory System," and assigned to the same assignee.

An object of the present invention is to provide a novel apparatus for reducing the unwanted signal which occurs in the output of a reading coil.

Another object of the present invention is to provide a simple apparatus for increasing the wanted to unwanted signal ratio in a magnetic matrix memory reading coil.

A further object of the present invention is to provide an inexpensive and novel system for reducing the unwanted signal obtained in reading the condition of a core in a magnetic matrix memory.

These and other objects of the invention are achieved by providing a plurality of reading coils for a magnetic matrix memory. These coils are coupled to groups of the magnetic cores. The cores in each group are so positioned within the memory that no core in any one given group is coupled to the same row and column coils as any other core in that group.

The output of each reading coil is coupled to a magnetic register. This register is cleared prior to any reading operation and then cleared again after a reading operation. Whether or not there is any output from the magnetic register is indicative of whether or not the core which is read was in a P or N saturation condition.

The novel features of this invention as well as the invention itself, both as to its organization and method of operation, will best be understood from the following description, when read in connection with the accompanying drawings, in which Figure 1 is a perspective view of a magnetic toroidal core and the various coils inductively coupled to it.

Figure 1:
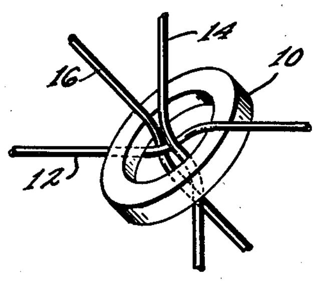

Figure 1 shows in perspective a magnetic toroidal core 10 with three wires passing through it. The core and the three wires are actually a portion of the magnetic memory which is represented schematically in Figure 2. Figure 1 is shown to assist in an understanding of Figure 2. The three wires are each portions of coils which are inductively coupled by a single turn to the core 10. One of the wires is a part of a row coil 12, the second of the wires is part of a column coil 14, and the third of the wires is a part of a reading coil 16.

Figure 2:
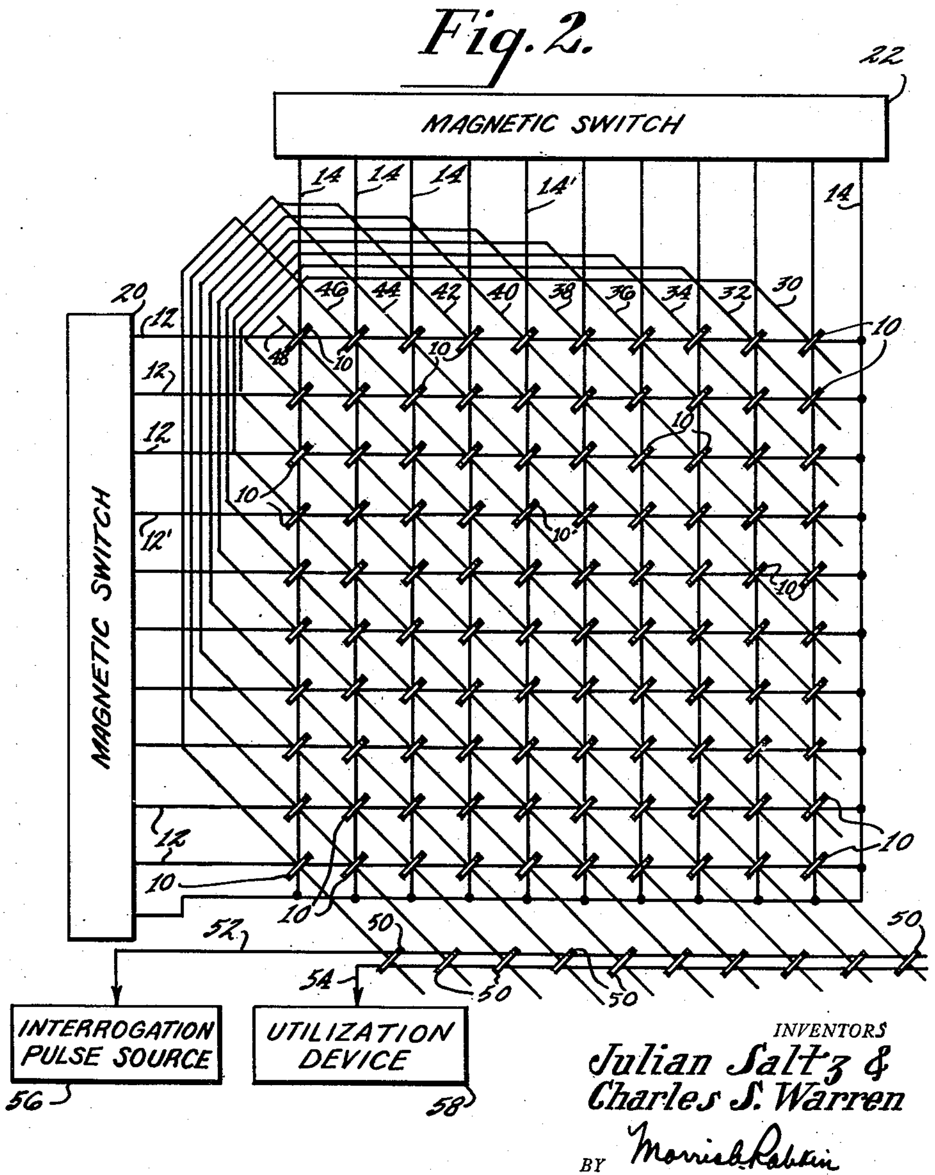
Figure 2 is a schematic drawing of an embodiment of the invention.

Referring now to Figure 2, there may be seen a static magnetic matrix consisting of a plurality of magnetic cores 10 arrayed for convenience in columns and rows. Each column of cores is coupled to a separate column coil 14 and each row of cores is coupled to a separate row coil 12. Magnetic switches, 20, 22, represented by rectangles, are provided to selectively excite a row and a column coil 12, 14 so that a desired core which is coupled to them at their intersection may be driven for the purpose of reading out the stored information, or writing information in.

Figure 3:
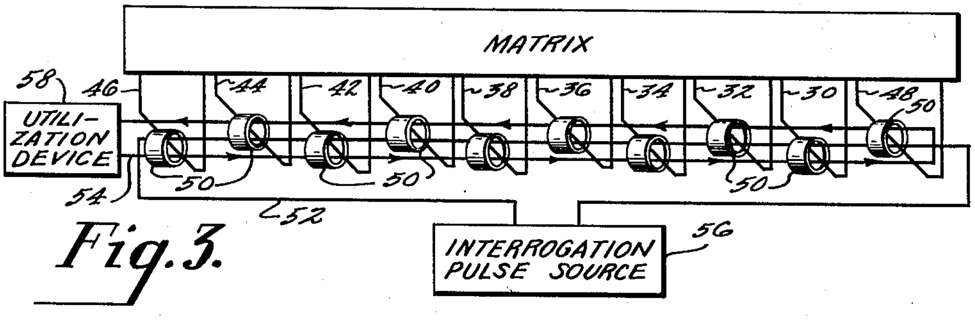
Figure 3 shows a schematic drawing of a system for coupling the magnetic register to the read-out coil to reduce noise.

A magnetic switch shown as a rectangle 20 or 22 of the type intended, is shown and described in detail in Figure 3 of the above cited article by J. A. Rajchman. It consists of a stack of cores to which are coupled a number of selecting coils in accordance with a desired code. Another coil is coupled to all the cores and is known as an N restore coil. Each coil has an associated driver tube for which it serves as a plate load. The switch cores are all usually in saturated condition at N in the standby condition. Each switch core is coupled to a different row coil in the case of the row coil driving magnetic switch and is coupled to a different column coil in the case of the column coil driving magnetic switch. When a switch core is driven from N to P or from P to N it induces a voltage in the coil to which it is coupled. A switch core is selected to be driven from N to P by applying signals to the grids of the driver tubes which draw current through the proper selecting coils coupled to that core. To restore the switch core to N a signal is applied to the grid of the tube which drives the N restore coil.

A memory core may be driven to P by simultaneously driving to P the two switch cores coupled to the row and column coils to which it is coupled. The switch cores are then sequentially restored to N. To restore them to N simultaneously would cause the memory core to be restored to N also.

Figure 4:
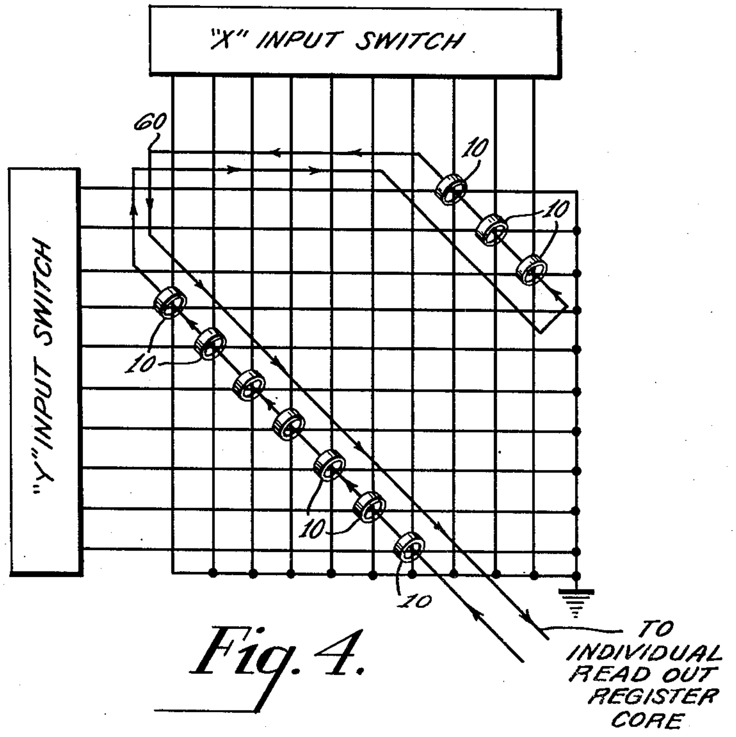
Figure 4 shows a system for coupling a reading coil to the cores in the memory to reduce stray pickup and noise.

What has been shown and described thus far is shown and described in detail in Figure 4 of the Jan A. Rajchman article cited previously.

Instead of a common reading coil for the entire matrix as shown in the article, a number of reading coils 30–48 are provided. These coils are coupled to the same number of cores 10. These cores constitute a group of cores. For example, one reading coil 48 is coupled to all the cores on a diagonal through the array of cores. Since the matrix shown is a ten-sided array, the group contains ten cores. A second reading coil 30 is coupled to a second group of cores consisting of the nine cores to the left of the cores on the diagonal plus the tenth core which is on the upper right corner of the array. A third core group to which a third reading coil 32 is coupled consists of eight cores to the left of the nine cores just mentioned plus the two cores which are to the left of the single core at the upper right hand corner of the array. In this manner the remaining cores are coupled to the remaining reading coils. Since there are 100 cores in the memory, ten reading coils are required. The reading coils are not shown as closed loops, in order to avoid confusion in the diagram. The part of each coil that is shown is the part that couples to the cores. The part not shown is the part required to complete the coil loop. Each one of the reading coils is coupled to a magnetic core 50. There are ten cores 50 required which comprise the magnetic register. These cores in the magnetic register must be selected to have a coercive force which is less than that of any core in the memory. The reason for this is that a core in the memory which is being read should be able to drive the core in the register which is coupled to its reading coil.

The magnetic register cores are all coupled to an interrogating coil 52 and to a read out coil 54. It should be apparent that the reading coils 30–48 are coupled to the cores 10 in each group in such a manner that every core in a given group is coupled to a different row and column coil. The significance of this may be appreciated if, for example, a core in the memory is selected to be driven; for example, core 10′. This core is coupled to a reading coil 46 which in turn is not coupled to any other core which is coupled to the excited row or column coil of the selected core 10′. Accordingly, the reading coil 46 is isolated from any unwanted signals provided by half-driven cores. The half driven cores along an excited row coil 12′ and column coil 14′ are coupled to the remaining reading coils so that no reading coil has more than two half-driven cores coupled thereto. This is a marked difference over the previously used common reading coil which, in the present memory, would have half drives from 19 half driven cores plus the output from the 20th selected core. Accordingly, a tremendous reduction of unwanted signal is provided.

The register cores are initially maintained at N. The output from a memory core being driven, if that core is turned over from N to P, is applied to the register core in the magnetic register coupled to the same reading coil to drive it from N to P. For read out, a pulse is applied from an interrogation pulse source to the interrogating coil of the magnetic register. If the magnetic register core is in P, the interrogating pulse will reset it to N, thus inducing a voltage in the output coil. If no output is obtained in the output coil, then the condition of the core in the memory which was interrogated is known as having been in N. The register core, in being reset, may induce a voltage back in the reading coil. However, by virtue of the fact that the coercive force of the register cores is selected to be lower than the memory cores, it can be seen that this induced voltage will have a negligible effect on the cores in the memory.

In order to minimize any unwanted signals from the magnetic register, caused by partial drives of register cores by the interrogation pulse, its cores may be inductively coupled to the readout winding in a manner to provide a substantial cancellation of the unwanted signals. This is shown in Fig. 3, wherein half the cores 50 are coupled in one sense to the read out winding 54 and the other half of the cores of the register are coupled in the opposite sense to the read out winding. Accordingly, there is substantial cancellation of unwanted signals from the register by virtue of the fact that the unwanted signals are induced in the read out winding from one-half of the cores in an opposite sense to the unwanted signals from the other half of the cores. Since all cores are in the same sense except possibly one, a better unwanted signal cancellation is obtainable than in the memory.

Fig. 4 shows a schematic of a portion of a memory to illustrate how a reading coil may be coupled to the cores in a group to minimize signals from half-driven cores and also to reduce any pickup in a reading coil through the air. The reading coil 60 is coupled to the memory cores 10 in its group on one side of a diagonal through the matrix in one sense and to the cores on the other side of the matrix diagonal in the opposite sense. Thus, any voltage induced as the result of half driving those cores which are on one side of the diagonal can be balanced out by the half drive provided to those cores on the other side of the diagonal. Furthermore, the side of the reading coil which is not coupled to any cores is positioned as close to the coil side which is coupled to cores as is physically possible for the purpose of avoiding any air pickup from excited selecting coils.

Not only does the magnetic register provide a means for substantially eliminating undesired reading signals, but it also permits reading what the condition of a memory magnetic core is just after the magnetic core has been placed in such position. The advantage of this is that the information written into a memory can be immediately checked and corrected for error.

Assume a three step operating schedule for driving the cores of the magnetic switches as described on pages 190 and 191 of the previously mentioned article by Rajchman. For writing P, first the selected cores in both switches are simultaneously driven to P, then they are reset to N in sequence. This uses three steps. For writing N, first the selected cores in both switches are driven to P, then they are simultaneously reset to N. If at the end of the first switch core drive to P the register cores are all set to the P condition, then at the end of the third step the register cores may be tested by applying another P pulse. If an output is obtained, then an N has been written into the memory. If no output is obtained, then a P has been written into the memory. This can be checked against the input information to the register. It should be appreciated that on the first step a selected memory core is driven to P regardless of whether it is desired to write P or N. Any effect of the memory core (if it was driven to P from N) on the register core is erased at the time by setting the register core in P. If the memory core is left in P by sequentially resetting the magnetic switches, there is no effect on the register cores and no output is obtained when another P drive is applied. If the memory core is driven to N in the second step it drives the register core to N also and this is evidenced by an output from the register core when it is driven to P again.

The manner of coupling the plurality of reading coils to the cores of a matrix is not any different from the one shown in Figure 2 where a matrix which is not square is involved. If the number of cores selected for each group is the number of cores in the larger side of the matrix, then no difficulty is experienced in having no cores in any given core group coupled to the same row and column coils.

There has been shown and described herein a novel, useful and simple system and apparatus for substantially eliminating unwanted signals from the reading signals obtained from a magnetic matrix memory.

What is claimed is:

1. In a magnetic matrix memory of the type having (1) a plurality of magnetic cores arrayed in columns and rows, (2) a separate row coil inductively coupled to all the cores in each row, (3) a separate column coil inductively coupled to all the cores in each column, and (4) means to selectively excite a row and a column coil to drive a desired magnetic core coupled to both said excited cores to saturation at a desired magnetic polarity, apparatus for reading the polarity of the cores of said memory comprising, a plurality of reading coils, each reading coil being coupled to a different group of cores within said memory, a magnetic register coupled to receive the output from said plurality of reading coils when a selected core is driven to saturation at a desired magnetic polarity, means to interrogate said register, and means to derive an output from said register.

2. In a magnetic matrix memory of the type having (1) a plurality of magnetic cores arrayed in columns and rows, (2) a separate row coil inductively coupled to all the cores in each row, (3) a separate column coil inductively coupled to all the cores in each column, and (4) means to selectively excite a row and a column coil to drive a desired magnetic core coupled to both said excited cores to saturation at a desired magnetic polarity, apparatus for reading the polarity of the cores of said memory comprising a plurality of reading coils, each reading coil being coupled to a different group of cores in said memory, each core in a given group being in a different row and a different column from any other core in said given group, and means coupled to receive the output from a reading coil when a desired core coupled to said reading coil is driven to saturation at a given polarity.

3. In a magnetic matrix memory of the type having (1) a plurality of magnetic cores arrayed in columns and rows, (2) a separate row coil inductively coupled to all the cores in each row, (3) a separate column coil inductively coupled to all the cores in each column, and (4) means to selectively excite a row and a column coil to drive a desired magnetic core coupled to both said excited cores to saturation at a desired magnetic polarity, apparatus for reading the polarity of the cores of said memory comprising, a plurality of reading coils, each reading coil being coupled to a different group of cores in said memory, each core in a given group being coupled to a row and column coil which is different from the ones to which any other core in said given group is coupled, means coupled to all said reading coils to register the output from one of said reading coils when a desired core coupled to said reading coil is driven to saturation at a given polarity, and means to clear said means to register.

4. Apparatus for reading the polarity of the cores of a magnetic memory as recited in claim 3 wherein said means to register the output from each of said reading coils comprises a plurality of magnetic cores, each core being inductively coupled to a different one of said plurality of reading coils.

5. Apparatus for reading the polarity of the cores of a magnetic memory as recited in claim 3 wherein said means to register the output from each of said reading coils comprises a plurality of magnetic cores, each core being inductively coupled to a different one of said plurality of reading coils, and an output coil coupled to all of said reading coils, and wherein said means to clear said means to register includes an interrogating coil coupled to all the cores of said means to register.

6. Apparatus as recited in claim 5 wherein said output coil is coupled to half the cores of said means to register in one sense and is coupled to the remaining half of the cores in the opposite sense.

7. The combination with a magnetic matrix memory, of the type having (1) a plurality of magnetic cores arrayed in columns and rows, (2) a separate row coil inductively coupled to all the cores in each row, (3) a separate column coil inductively coupled to all the cores in each column, and (4) means to selectively excite a row and a column coil to drive a desired magnetic core coupled to both said excited cores to saturation at a desired magnetic polarity, of means to read the polarity of the cores of said memory comprising a plurality of reading coils, each coil being coupled to a group of cores in said memory, none of the cores in a given group being coupled to the same row and column coils, a magnetic register coupled to all said reading coils, wherein the condition of a core being driven to saturation at a predetermined polarity is entered in said register, means to interrogate said register, and means to derive an output from said register when it is interrogated.

8. The combination as recited in claim 7 wherein said magnetic register includes a different magnetic core coupled to each reading coil, said means to interrogate said register includes an interrogation coil coupled to all said register magnetic cores, and means to apply interrogating pulses to said interrogating coil, said means to derive an output from said register includes an output coil coupled to all the cores in said register.

9. A plurality of magnetic cores individually identifiable as corresponding to the elements of a matrix arranged in rows and columns, a plurality of coils each different one coupled to all the cores corresponding to a different selected row, a second plurality of coils each different one coupled to all the cores corresponding to a different selected column, whereby any selected core corresponds to an element at a selected row and column intersection, and a third plurality of coils each coupled to a different group of cores, each core in a given group corresponding to an element of a different row and a different column from that of any other core in its same group.

10. A magnetic memory having a plurality of cores individually identifiable as corresponding to the elements of a matrix arrayed in rows and columns, a plurality of coils each coupled to excite the cores corresponding to a selected row of elements, a second plurality of coils each coupled to excite the cores corresponding to a selected column of elements, thereby to drive to saturation only a selected core corresponding to the element at the selected row and column intersection, and a third plurality of coils each coupled to a different group of cores within the memory, each core in a given group corresponding to an element of a different row and a different column from that of any other core in its same group, whereby the selected core excites one and only one of said third plurality of coils.

No references cited.